US012459257B2

(12) United States Patent
Hayashi

(10) Patent No.: US 12,459,257 B2
(45) Date of Patent: Nov. 4, 2025

(54) PRINTING DEVICE AND PRINTING METHOD

(71) Applicant: SEIKO EPSON CORPORATION, Tokyo (JP)

(72) Inventor: Takuma Hayashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 168 days.

(21) Appl. No.: 18/454,837

(22) Filed: Aug. 24, 2023

(65) Prior Publication Data

US 2024/0066863 A1 Feb. 29, 2024

(30) Foreign Application Priority Data

Aug. 26, 2022 (JP) ................................ 2022-134872

(51) Int. Cl.
*B41J 2/045* (2006.01)
*B41J 2/155* (2006.01)

(52) U.S. Cl.
CPC ....... *B41J 2/04593* (2013.01); *B41J 2/04553* (2013.01); *B41J 2/04566* (2013.01); *B41J 2/0458* (2013.01); *B41J 2/04581* (2013.01); *B41J 2/155* (2013.01)

(58) Field of Classification Search
None
See application file for complete search history.

(56) References Cited

U.S. PATENT DOCUMENTS

| | | | | |
|---|---|---|---|---|
| 7,637,578 B2 * | 12/2009 | Chang | B41J 2/2135 347/41 |
| 2007/0008363 A1 * | 1/2007 | Hamasaki | B41J 2/2132 347/15 |
| 2008/0106573 A1 * | 5/2008 | Chang | B41J 25/003 347/41 |

FOREIGN PATENT DOCUMENTS

JP 2020-040215 A 3/2020

* cited by examiner

*Primary Examiner* — Scott A Richmond
(74) *Attorney, Agent, or Firm* — Global IP Counselors, LLP

(57) ABSTRACT

The print head 10 includes a nozzle region NA1 in which a distance between a nozzle array 23Y and a nozzle array 23C is a distance D1 and a nozzle region NA2 in which a distance between a nozzle array 23Y and a nozzle array 23C is a distance D2. When a ratio of sizes of a plurality of ink droplets ejected from nozzles of a nozzle region NA1 is defined as a first ratio and a ratio of sizes of a plurality of ink droplets ejected from nozzles of a nozzle region NA2 is defined as a second ratio, a control section 30 executes a first print in which a ratio of ink droplets having a size other than a maximum size in the second ratio is smaller than a ratio of ink droplets having a size other than a maximum size in the first ratio.

8 Claims, 7 Drawing Sheets

| | FIRST PRINT | | SECOND PRINT | |
|---|---|---|---|---|
| NOZZLE ARRAY DISTANCE | SMALL DOT | LARGE DOT | SMALL DOT | LARGE DOT |
| D1 | 50% | 100% | 50% | 100% |
| D2 | 20% | 100% | 50% | 100% |
| D3 | 50% | 100% | 50% | 100% |

FIG. 6

| INPUT IMAGE COLOR | INK COLOR COMBINATION | NOZZLE ARRAY DISTANCE |
|---|---|---|
| R | Y+M | DIFFERENT (D1,D2) |
| G | Y+C | DIFFERENT (D1,D2) |
| B | M+C | CONSTANT (D3) |

FIG. 7

PRINTING DEVICE AND PRINTING METHOD

The present application is based on, and claims priority from JP Application Serial Number 2022-134872, filed Aug. 26, 2022, the disclosure of which is hereby incorporated by reference herein in its entirety.

BACKGROUND

1. Technical Field

The present disclosure relates to a printing device and a printing method.

2. Related Art

An ink jet printer which is one of printing devices forms an image on a medium such as paper by ejecting ink droplets onto a medium from a plurality of nozzles provided in a print head. Specifically, the print head includes a plurality of nozzles arranged in a nozzle array direction, and forms the image on the medium by ejecting ink droplets from the nozzles of the print head toward the medium while transporting the medium in a relative movement direction different from the nozzle array direction.

JP-A-2020-40215 discloses a technique related to a line head type inkjet printer in which nozzles are arranged in an entire width direction that intersects a transport direction of the medium. Hereinafter, the line head type inkjet printer is also referred to as a line printer.

In the line printer disclosed in JP-A 2020-40215, nozzle arrays of cyan (C), magenta (M), yellow (Y), and black (K) are arranged in two rows and two columns on one head chip. Specifically, the nozzle array of C and the nozzle array of Y are arranged in an arrangement direction of the nozzles, and the nozzle array of M and the nozzle array of K are arranged in an arrangement direction of the nozzles. A print head is configured by arranging a plurality of such head chips in a width direction of the medium.

In a case where a plurality of head chips are arranged in the width direction of the medium as described above, a region in which the nozzles are not present is formed between the head chips. For this reason, the print head is configured such that a plurality of head chips are arranged in the width direction of the medium and a plurality of head chips are also arranged in the transport direction so that the head chips overlap in the transport direction.

However, in a case where the print head is configured such that the head chips overlap each other in the transport direction, when a secondary color is formed by ink droplets ejected from two nozzle arrays, a streak or color unevenness along the transport direction may occur.

That is, when the secondary color is formed, ink droplets of different colors are ejected from different nozzle arrays on the same line along the transport direction. At this time, on the same line along the transport direction, there are a combination in which a nozzle array distance is constant and a combination in which a nozzle array distance is different.

For example, in a case where a nozzle array distance is long in the transport direction, since there is a period of time after a landing of a first ink droplet until it dries, even when the next ink droplet lands, good coloring is exhibited. On the other hand, in a case where a nozzle array distance is short in the transport direction, after a first ink droplet has landed, a next ink droplet lands before the first ink droplet dries, so that the ink droplets interfere with each other and bleed, so that good coloring cannot be obtained. As described above, since there is a difference in coloring depending on a nozzle array distance in the transport direction, the difference in coloring is visually recognized as a streak or color unevenness.

In the technique disclosed in JP-A-2020-40215, the first ink droplet and the next ink droplet are prevented from interfering with each other on the medium when a combination of head arrays for forming a secondary color is a combination of head arrays having different nozzle array distances. In other words, by reducing a ratio of overlapping of ink droplets on the medium, the occurrence of a difference in coloring is suppressed. However, in the configuration in which the color unevenness is suppressed by preventing the ink droplets from interfering with each other, there is a problem that it is not possible to cope with a case where a printing duty increases, that is, a case where an amount of ink to be ejected increases. Therefore, there is a need for other techniques for suppressing a streak and color unevenness.

SUMMARY

A printing device according to one aspect of the disclosure includes a print head that includes a plurality of nozzles configured to eject ink droplets onto a medium, and that includes a plurality of nozzle arrays in which the nozzles are arranged in a nozzle array direction and a control section configured to control ejection of the ink droplets from the nozzles, wherein the print head and the medium relatively move in a relative movement direction different from the nozzle array direction, the print head includes first nozzle arrays and second nozzle arrays that eject different ink droplets, a number of the first nozzle arrays and a number of the second nozzle arrays are each two or more, the plurality of nozzle arrays which eject ink droplets on a same line along the relative movement direction include a first nozzle region in which a distance between the first nozzle array and the second nozzle array in the relative movement direction is a first distance and a second nozzle region in which a distance between the first nozzle array and the second nozzle array in the relative movement direction is a second distance which is longer than the first distance, the nozzles are configured to form dots of a plurality of sizes on the medium by ejecting ink droplets of a plurality of sizes, and when a ratio of sizes of a plurality of ink droplets ejected from the nozzles of the first nozzle region is defined as a first ratio and a ratio of sizes of a plurality of ink droplets ejected from the nozzles of the second nozzle region is defined as a second ratio, the control section executes a first print in which a ratio of ink droplets having a size other than a maximum size in the second ratio is smaller than a ratio of ink droplets having a size other than a maximum size in the first ratio.

A printing method for a printing device according to one aspect of the disclosure including a print head that includes a plurality of nozzles configured to eject ink droplets onto a medium, and that includes a plurality of nozzle arrays in which the nozzles are arranged in a nozzle array direction, wherein the print head and the medium relatively move in a relative movement direction different from the nozzle array direction, the print head includes first nozzle arrays and second nozzle arrays that eject different ink droplets, a number of the first nozzle arrays and a number of the second nozzle arrays are each two or more, the plurality of nozzle arrays which eject ink droplets on a same line along the relative movement direction include a first nozzle region in which a distance between the first nozzle array and the second nozzle array in the relative movement direction is a first distance and a second nozzle region in which a distance between the first nozzle array and the second nozzle array in the relative movement direction is a second distance which is longer than the first distance, and the nozzles are configured to form dots of a plurality of sizes on the medium by ejecting ink droplets of a plurality of sizes, the printing method includes performing a first printing step in which, when a ratio of sizes of a plurality of ink droplets ejected from the nozzles in the first nozzle region is defined as a first ratio and a ratio of sizes of a plurality of ink droplets ejected from the nozzles in the second nozzle region is defined as a second ratio, a ratio of ink droplets having a size other than a maximum size in the second ratio is smaller than the ratio of ink droplets having a size other than a maximum size in the first ratio.

BRIEF DESCRIPTION OF THE DRAWINGS

FIG. 6 is a table showing an upper limit of a usage rate of each dot size according to the nozzle array distance and a print mode.

FIG. 7 is a table showing a relationship among an input image color, a combination of ink colors, and the nozzle array distance.

DESCRIPTION OF EMBODIMENTS

Hereinafter, an embodiment of the present disclosure will be described with reference to drawings.

Figure 1:
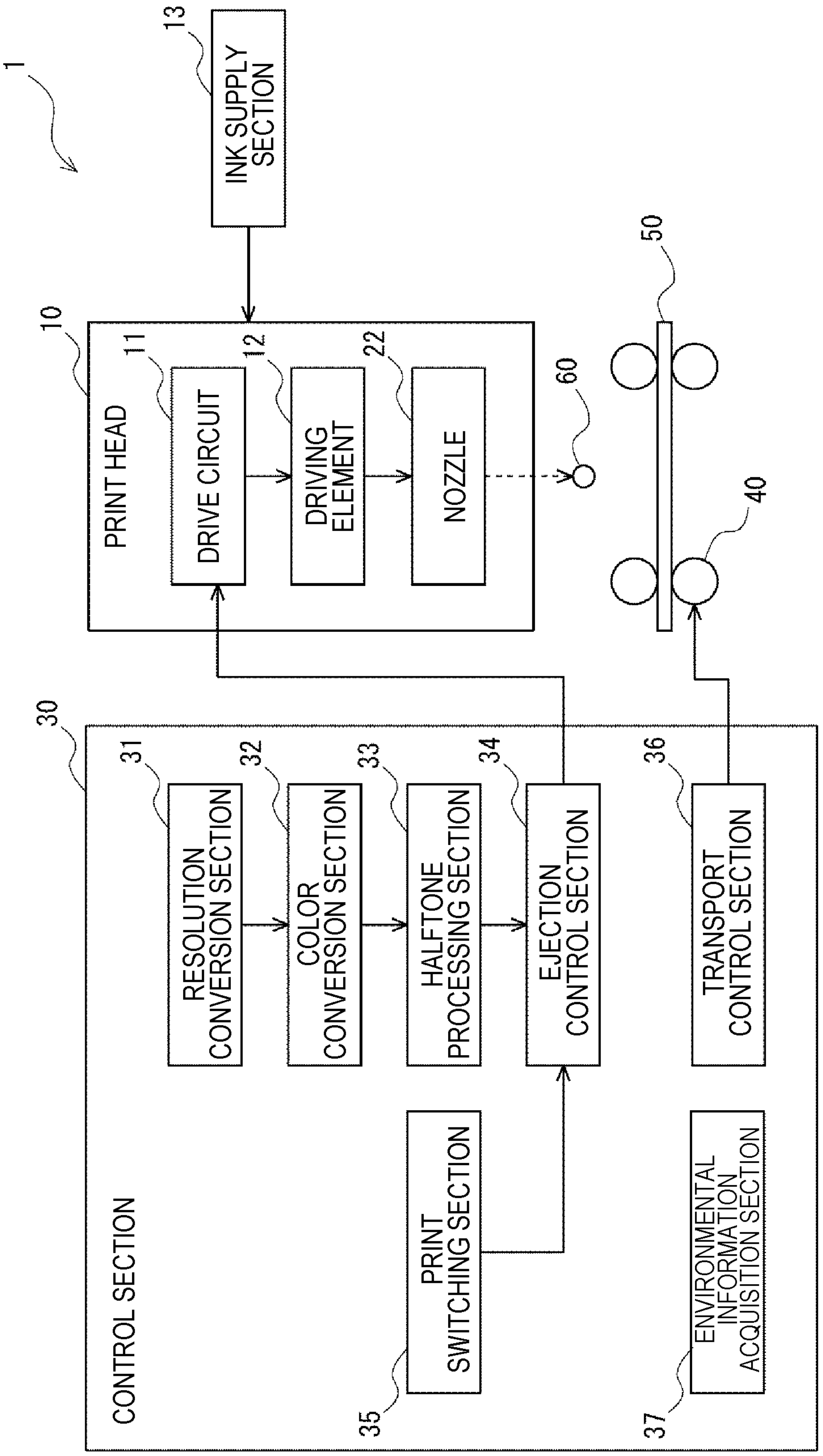
FIG. 1 is a block diagram showing an example of a printing device according to an embodiment.
Figure 2:
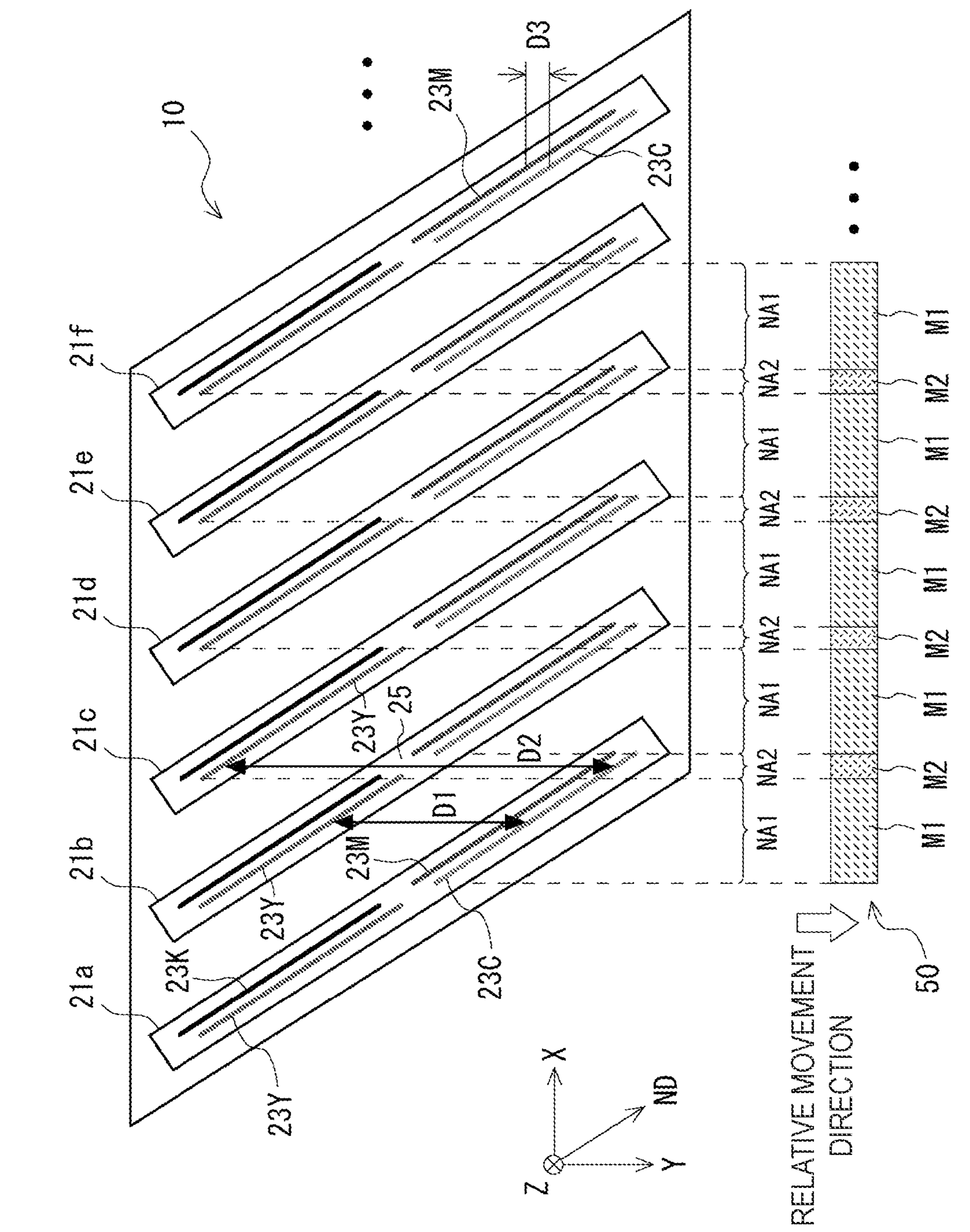
FIG. 2 is a schematic diagram showing an example of a print head included in the printing device according to the embodiment.
Figure 3:
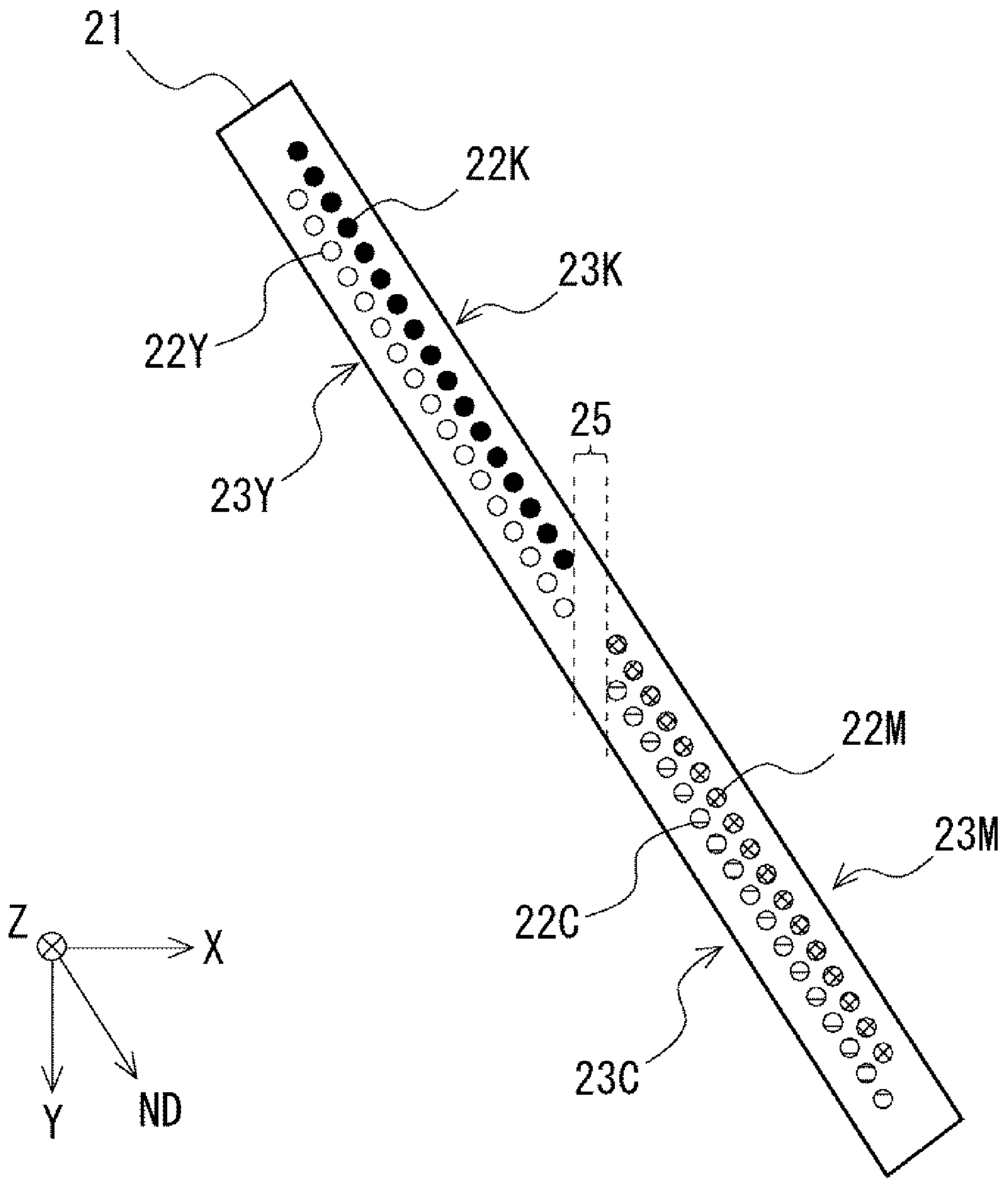
FIG. 3 is a schematic diagram showing an example of a head chip included in the print head.

FIG. 1 is a block diagram showing an example of a printing device 1 according to an embodiment. FIG. 2 is a schematic diagram showing an example of a print head 10 included in the printing device 1 according to the embodiment. FIG. 3 is a schematic diagram showing an example of a head chip 21 included in the print head 10. FIGS. 2 and 3 are schematic diagrams of the print head 10 and the head chip 21 viewed from the back, and ink droplets are ejected in the plus direction of a Z-axis.

The printing device 1 according to the present embodiment is typically an inkjet printer, and the present specification shows an example of a configuration of a line printer as an example. The disclosure according to the present embodiment can be widely applied to a device using an inkjet technology, such as a copier, a facsimile, and a multifunction device having these functions.

As shown in FIG. 1, the printing device 1 according to the present embodiment includes a print head 10, a control section 30, and a transport mechanism 40. The printing device 1 according to the embodiment forms an image on a medium 50 by ejecting ink droplets 60 onto the medium 50 from nozzles 22 provided in a print head 10. The medium 50 is transported by the transport mechanism 40. Ink is supplied from an ink supply section 13 to the nozzles 22 of the print head 10.

Specifically, as shown in FIG. 2, the print head 10 includes a plurality of head chips 21*a* to 21*f*. The plurality of head chips 21*a* to 21*f* are arranged in a X-axis direction, that is, in a width direction of the medium 50. Each of the head chips 21*a* to 21*f* includes a plurality of nozzle arrays 23C, 23M, 23Y, and 23K arranged in a nozzle array direction ND. In each of the nozzle arrays 23C, 23M, 23Y, and 23K, a plurality of nozzles 22C, 22M, 22Y, and 22K (refer to FIG. 3) are formed. The plurality of head chips 21*a* to 21*f* are provided so as to extend in the nozzle array direction ND. In other words, the plurality of head chips 21*a* to 21*f* are provided so as to be oblique to the X-axis direction.

In the printing device 1 according to the present embodiment, an image is formed on the medium 50 by the relative movement of the print head 10 and the medium 50 in a relative movement direction (Y-axis direction) different from the nozzle array direction ND. In other words, the image is formed on the medium 50 by ejecting ink droplets 60 toward the medium 50 from the nozzle arrays 23C, 23M, 23Y, and 23K of the print head 10 while transporting the medium 50 in the relative movement direction. In the present specification, the "relative movement direction" is synonymous with the "transport direction". FIG. 2 shows only a part of the medium 50.

As shown in FIG. 3, the head chip 21 includes four nozzle arrays 23C, 23M, 23Y, and 23K. Four nozzle arrays 23C, 23M, 23Y, and 23K are arranged in two rows and two columns. Specifically, the nozzle array 23C and the nozzle array 23Y are arranged in the nozzle array direction ND, and the nozzle array 23M and the nozzle array 23K are arranged in the nozzle array direction ND. In the specification, the head chips 21*a* to 21*f* are also generically referred to as a head chip 21. The same applies to the other components.

The nozzle array 23C includes a plurality of nozzles 22C arranged in the nozzle array direction ND. The plurality of nozzles 22C are configured to be capable of independently ejecting ink droplets of cyan (C). The nozzle array 23M includes a plurality of nozzles 22M arranged in the nozzle array direction ND. The plurality of nozzles 22M are configured to be capable of independently ejecting ink droplets of magenta (M). The nozzle array 23Y includes a plurality of nozzles 22Y arranged in the nozzle array direction ND. The plurality of nozzles 22Y are configured to be capable of independently ejecting ink droplets of yellow (Y). The nozzle array 23K includes a plurality of nozzles 22K arranged in the nozzle array direction ND. The plurality of nozzles 22K are configured to be capable of independently ejecting ink droplets of black (K). Each nozzle 22C, 22M, 22Y, 22K is supplied with ink of each color from an ink supply section 13 (refer to FIG. 1).

As shown in FIG. 3, the head chip 21 includes a gap 25 between the nozzle array 23Y and the nozzle array 23C and between the nozzle array 23K and the nozzle array 23M. The gap 25 extends a predetermined distance in the X-axis direction, and is a region where the nozzle array 23 is not formed.

Although FIG. 3 shows a configuration in which one head chip 21 includes four nozzle arrays 23C, 23M, 23Y, and 23K, one head chip may include five or more nozzle arrays in the present embodiment. For example, the head chip 21 may further include a nozzle array which ejects light cyan (Lc), light magenta (Lm), dark yellow (Dy), light black (Lk), red (R), orange (Or), green (G), non-colored ink for improving image quality, or the like. The number of nozzles included in one nozzle array 23 may be an arbitrary number.

In the present embodiment, the print head 10 shown in FIG. 2 can be configured by arranging a plurality of the head chips 21 shown in FIG. 3 in the X-axis direction. By further providing a plurality of print heads 10 including a plurality of head chips 21*a* to 21*f* in the X-axis direction, a line head in which nozzle arrays are arranged in an entire width direction of the medium 50 can be configured. In a configuration example shown in FIG. 2, a configuration example in which six head chips 21*a* to 21*f* are provided in one print head 10 is shown, but the number of head chips 21 provided in one print head 10 may be less than six or may be more than six.

Next, a system configuration of the printing device 1 according to the present embodiment will be described with reference to FIG. 1. As shown in FIG. 1, the printing device 1 according to the present embodiment includes the print head 10, the control section 30, and the transport mechanism 40. The print head 10 includes a drive circuit 11, a driving element 12, and a nozzle 22. The control section 30 includes a resolution conversion section 31, a color conversion section 32, a halftone processing section 33, an ejection control section 34, a print switching section 35, a transport control section 36, and an environmental information acquisition section 37. The control section 30 can be configured using, for example, a system on a chip (SoC) or the like.

The resolution conversion section 31 included in the control section 30 generates input color data obtained by converting a resolution of supplied image data to a print resolution for printing on the medium 50. For example, print resolutions are 720×720 dpi, 360×360 dpi, and the like. The supplied image data is expressed by, for example, RGB data having integer values of 256 gradations of RGB in each pixel. When obtained image data is not RGB data, the image data may be converted into RGB data.

The color conversion section 32 performs a color conversion process on the input color data generated by the resolution conversion section 31 to generate output color data which is CMYK data. Specifically, the color conversion section 32 color-converts the RGB data set as the print resolution into CMYK data having integer values of 256 gradations of CMYK in each pixel.

The halftone processing section 33 performs halftone process on the basis of output color data which is color-converted image data. The halftone processing section 33 performs a predetermined halftone process, such as a dither method, an error diffusion method, or a density pattern method, on a gradation value (ink amount data) of each pixel constituting the output color data to reduce the number of gradations of the gradation value, and generates print data.

The ejection control section 34 generates a control signal for controlling the driving element 12 based on the print data generated by the halftone processing section 33. For example, the ejection control section 34 generates a drive signal corresponding to a voltage signal to be applied to the driving element 12 of the print head 10 as the control signal on the basis of the print data. The control signal generated by the ejection control section 34 is supplied to the drive circuit 11 of the print head 10.

The print switching section 35 switches a print of the printing device 1 to a first print or a second print (to be described later). In the embodiment, the ejection control section 34 may generate the control signal for controlling the nozzles 22 according to the print signal supplied from the print switching section 35.

The transport control section 36 controls a transport mechanism 40 for transporting the medium 50 in the relative movement direction. For example, the transport mechanism 40 can be configured using a roller or the like.

In the present embodiment, the control section 30 may include an environmental information acquisition section 37. The environmental information acquisition section 37 acquires environmental information of a place where the printing device 1 is installed. For example, the environmental information is temperature, humidity, or the like in the vicinity of the print head 10.

The drive circuit 11 provided in the print head 10 applies the voltage signal to the driving element 12 based on the control signal supplied from the ejection control section 34. As the driving element 12, a piezoelectric element for applying pressure to ink in a pressure chamber communicating with the nozzle 22, a bubble generating element for generating bubbles in the pressure chamber by heat and ejecting ink droplets 60 from the nozzle 22, or the like can be used. Ink is supplied from the ink supply section 13 to the pressure chamber of the print head 10.

The ink in the pressure chamber is ejected as ink droplets 60 from the nozzles 22 toward the medium 50 by the driving element 12, and dots of the ink droplets 60 are formed on the medium 50. Thus, the control section 30 can form an image on the medium 50 by ejecting the ink droplets 60 from the nozzles 22 of the print head 10 toward the medium 50 while transporting the medium 50 in the relative movement direction.

In the printing device 1 according to the present embodiment, as shown in FIG. 2, the plurality of head chips 21*a* to 21*f* are arranged in the X-axis direction to constitute a print head 10. At this time, the head chips 21*a* to 21*f* are arranged so as to overlap each other in the relative movement direction (Y-axis direction). Each of the head chips 21*a* to 21*f* includes the gap 25 between the nozzle array 23Y and the nozzle array 23C, and between the nozzle array 23K and the nozzle array 23M.

Therefore, on the same line along the relative movement direction (Y-axis direction), there are combinations in which the nozzle arrays have different nozzle array distances. For example, a combination of yellow (Y) and cyan (C) is a combination having a different nozzle array distance. That is, in the case of the combination of yellow (Y) and cyan (C), there are a nozzle region NA1 in which a distance between the nozzle array 23Y (first nozzle array) for yellow (Y) and the nozzle array 23C (second nozzle array) for cyan (C) in the relative movement direction is a distance D1, and a nozzle region NA2 in which a distance between the nozzle array 23Y for yellow (Y) and the nozzle array 23C for cyan (C) in the relative movement direction is a distance D2. At this time, the nozzle array distance D2 (second distance) in the nozzle region NA2 (second nozzle region) is longer than the nozzle array distance D1 (first distance) in the nozzle region NA1 (first nozzle region).

Therefore, when green (G), which is a secondary color of yellow (Y) and cyan (C), is printed on the medium 50, a region M1 printed by the nozzle region NA1 in which the nozzle array distance is a distance D1, and a region M2 printed by the nozzle region NA2 in which the nozzle array distance is a distance D2 are formed on the medium 50. Since the nozzle array distances D1 and D2 are different between the nozzle region NA1 and the nozzle region NA2, the time from a landing of a first ink droplet 60 on the medium 50 to a landing of a next ink droplet 60 on the medium 50 is different.

Figure 4:
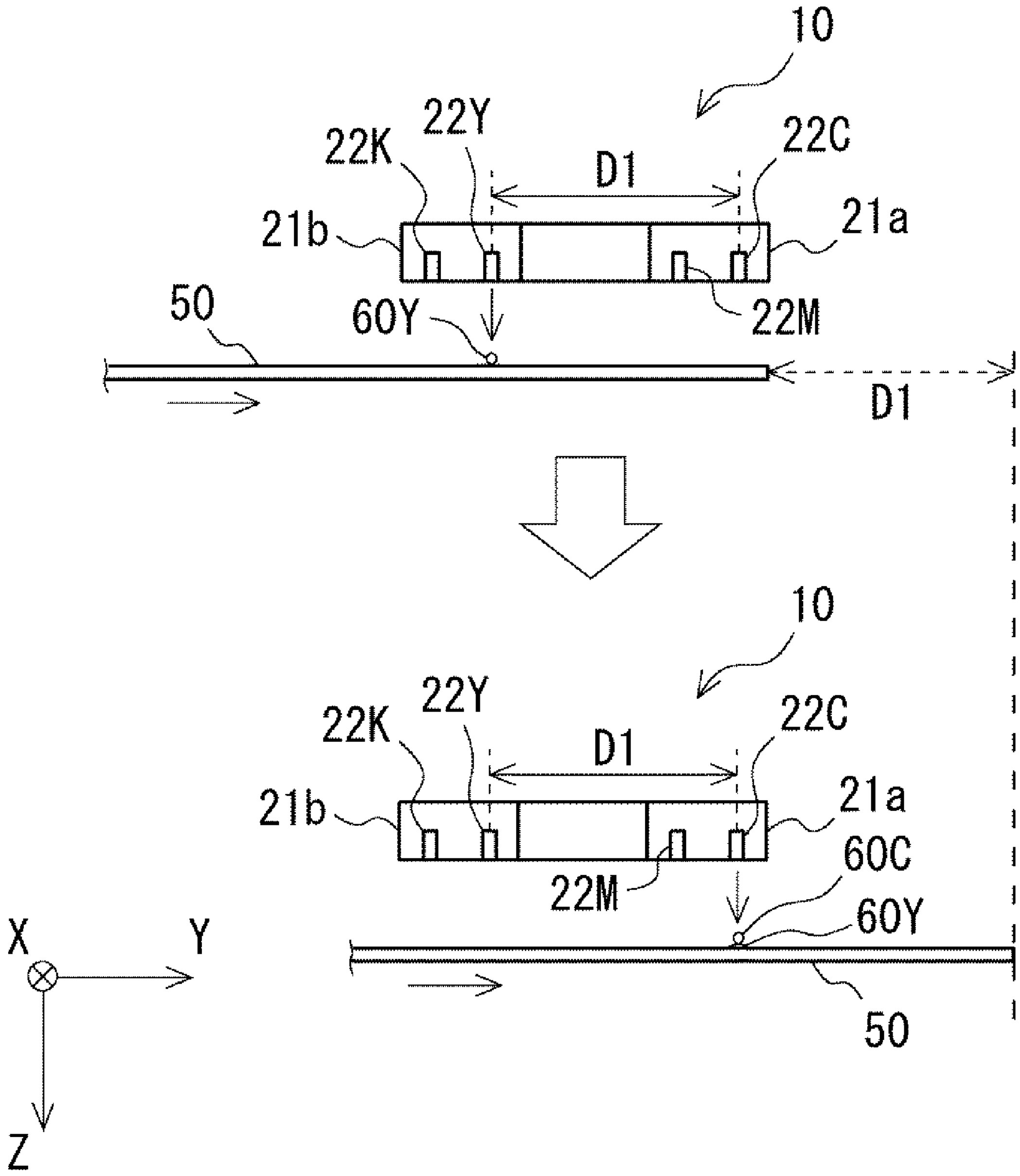
FIG. 4 is a diagram for explaining an operation of printing a secondary color in a nozzle region NA1 where a nozzle array distance is a distance D1.

FIG. 4 is a diagram for explaining an operation of printing a secondary color in the nozzle region NA1 where a nozzle array distance is a distance D1. As shown in the upper part of FIG. 4, when green (G), which is a secondary color, is printed on the medium 50, a yellow ink droplet 60Y is first ejected from the nozzle 22Y to form a dot of the ink droplet 60Y on the medium 50. Thereafter, after the medium 50 has moved a distance D1 in the relative movement direction (Y-axis direction), a cyan ink droplet 60C is ejected from the nozzle 22C to form a dot of the ink droplet 60C on the medium 50, as shown in a lower part of FIG. 4. At this time, a time from a landing of a first ink droplet 60Y on the medium 50 to a landing of a next ink droplet 60C on the medium 50 corresponds to the nozzle array distance D1.

Figure 5:
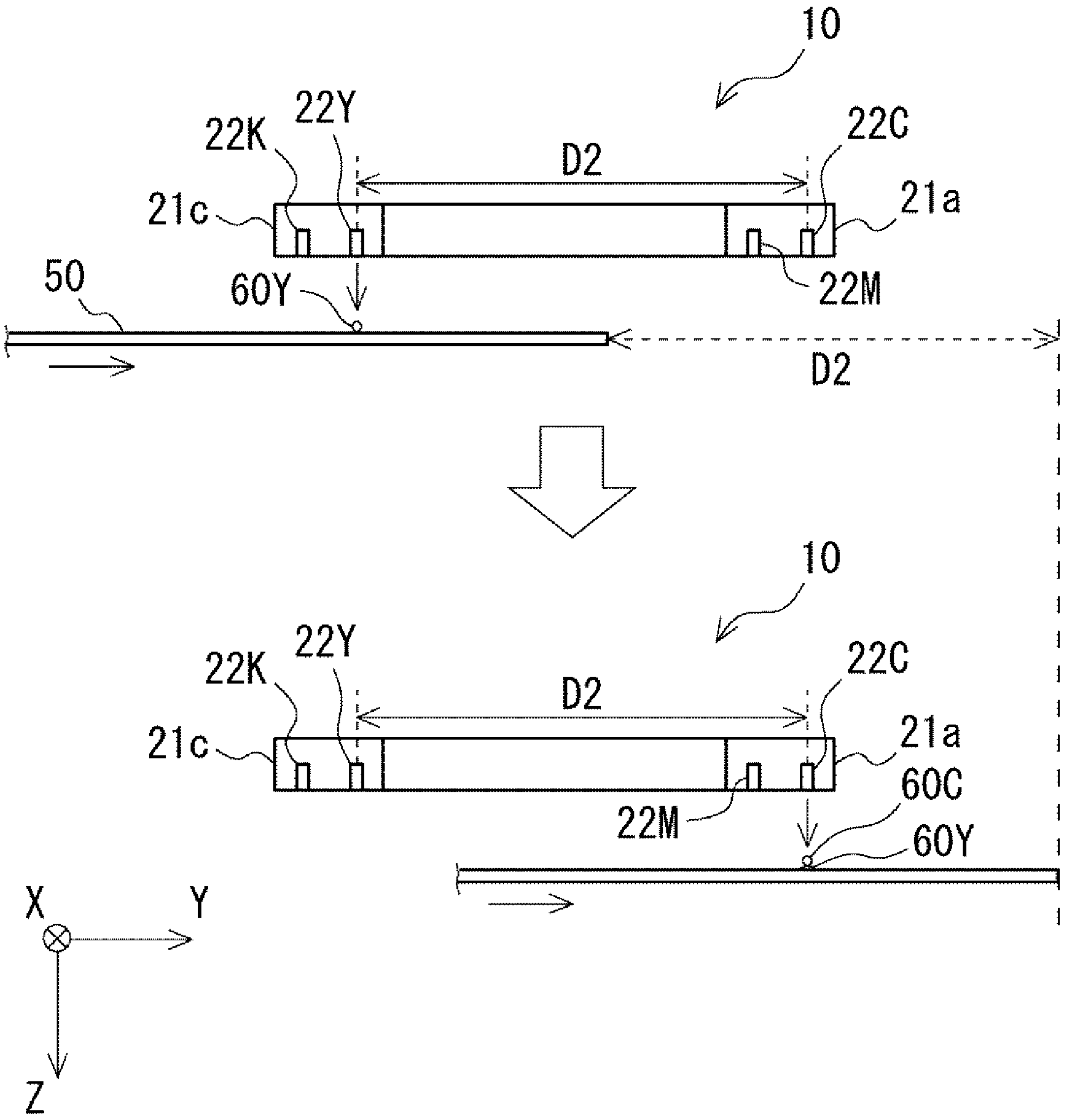
FIG. 5 is a diagram for explaining an operation of printing a secondary color in a nozzle region NA2 where a nozzle array distance is a distance D2.

FIG. 5 is a diagram for explaining an operation of printing a secondary color in the nozzle region NA2 where a nozzle array distance is a distance D2. As shown in the upper part of FIG. 5, when green (G), which is a secondary color, is printed on the medium 50, a yellow ink droplet 60Y is first ejected from the nozzle 22Y to form a dot of the ink droplet 60Y on the medium 50. Thereafter, after the medium 50 has moved a distance D2 in the relative movement direction (Y-axis direction), a cyan ink droplet 60C is ejected from the nozzle 22C to form a dot of the ink droplet 60C on the medium 50, as shown in a lower part of FIG. 5. At this time, a time from a landing of a first ink droplet 60Y on the medium 50 to a landing of a next ink droplet 60C on the medium 50 corresponds to the nozzle array distance D2.

Thus, since the nozzle array distances D1 and D2 are different between the nozzle region NA1 and the nozzle region NA2, a time from a landing of a first ink droplet 60Y on the medium 50 to a landing of a next ink droplet 60C on the medium 50 is different. That is, since the nozzle array distance D2 is longer than the nozzle array distance D1, in the nozzle region NA2, the time from the landing of the first ink droplet 60Y on the medium 50 to the landing of the next ink droplet 60C on the medium 50 is longer than that in the nozzle region NA1. For this reason, in the related art, a streak or color unevenness along the relative movement direction may occur in the medium 50.

That is, in the nozzle region NA2, since the nozzle array distance D2 is long, there is a time after the landing of the first ink droplet 60Y until it dries, and even if the next ink droplet 60C lands, good coloring is exhibited. On the other hand, in the nozzle region NA1, since the nozzle array distance D1 is short, after the first ink droplet is landed, the next ink droplet is landed before the first ink droplet dries, so that the ink droplets interfere with each other and bleed, thereby suppressing coloring. As described above, since there is a difference in coloring depending on the nozzle array distances D1 and D2 in the relative movement direction, this difference in coloring may be visually recognized as the streak or color unevenness. In other words, since coloring is good in the nozzle region NA1, color is darker than that in the nozzle region NA2, and a dark streak may occur.

In order to solve such a problem, the printing device 1 according to the present embodiment has the following configuration. That is, in the printing device 1 according to the present embodiment, each of the nozzles 22 is configured to be capable of ejecting ink droplets of a plurality of sizes. In other words, the printing device 1 is configured to be capable of forming dots of a plurality of sizes on the medium 50.

A ratio of sizes of a plurality of ink droplets ejected from the nozzles 22 in the nozzle region NA1 is defined as a first ratio, and a ratio of sizes of a plurality of ink droplets ejected from the nozzles 22 in the nozzle region NA2 is defined as a second ratio. In the present embodiment, the control section 30 is configured to be able to execute a print (first print) in which a ratio of ink droplets having a size other than the maximum size in the second ratio is smaller than a ratio of ink droplets having a size other than the maximum size in the first ratio. In other words, in the second ratio, a usage rate of the smallest ink droplet among the ink droplets having a plurality of sizes is set to be smaller than that in the first ratio.

For example, in a case where types of ink droplets ejected from the nozzles 22 are two types of large ink droplets and small ink droplets, "a proportion of ink droplets having a size other than the maximum size in the first ratio" means "a proportion of small ink droplets". In a case where types of ink droplets ejected from the nozzles 22 are three types of large ink droplets, meddle ink droplets, and small ink droplets, "a proportion of ink droplets having a size other than the maximum size in the first ratio" means "a proportion of small ink droplets and meddle ink droplets". The same applies to the second ratio.

FIG. 6 is a table showing an upper limit of a usage rate of each dot size according to the nozzle array distance and the first print or the second print. For example, in a case where each of the nozzles 22 can eject two types of ink droplets of small ink droplets and large ink droplets, small dots and large dots are formed on the medium 50. In the present specification, ink ejected from the nozzle 22 is expressed as a "small ink droplet" and a "large ink droplet", and a dot formed on the medium 50 by these ink droplets are expressed as a "small dot" and a "large dot", which have substantially the same meaning.

As shown in the first print of FIG. 6, a ratio (first ratio) of the sizes of the plurality of ink droplets ejected from the nozzle 22 having the nozzle array distance D1, that is, the nozzle 22 in the nozzle region NA1, is small dots=50% and large dots=100%. Here, "small dot=50%" indicates the maximum value of a usage rate of small dots, and "large dot=100%" indicates the maximum value of a usage rate of large dots. In this case, "a proportion of ink droplets having a size other than the maximum size in the first ratio" is "the maximum value of a usage rate of small ink droplets=50%".

Similarly, a ratio (second ratio) of the sizes of the plurality of ink droplets ejected from the nozzle 22 having the nozzle array distance D2, that is, the nozzle 22 in the nozzle region NA2, is small dots=20% and large dots=100%. In this case, "a proportion of ink droplets having a size other than the maximum size in the second ratio" is "the maximum value of a usage rate of small ink droplets=20%".

As described above, in the present embodiment, the nozzle region NA2 having the nozzle array distance D2 is set so that a usage rate of small dots is low. In other words, in the nozzle region NA2 where the nozzle array distance D2 is long, the maximum value of the usage rate of the small dots is set lower than that in the nozzle region NA1 where the nozzle array distance D1 is short. In other words, in the second ratio which is the ratio of the size of the ink droplet in the nozzle region NA2, the usage rate of the smallest ink droplet among the ink droplets having a plurality of sizes is set to be smaller than that in the first ratio which is the ratio of the size of the ink droplet in the nozzle region NA1.

Here, since small ink droplets are small, the small ink droplets hardly penetrate deeply into the medium 50 after landing on the medium 50, and since the droplets are less likely to bleed each other, the small ink droplets are fixed and dried near a surface of the medium 50, and good coloring is exhibited. On the other hand, since large ink droplets are large, the large ink droplets penetrate deeply into the medium 50 after landing on the medium 50, and the droplets may bleed with each other, so that the large ink droplets tend to suppress the coloring visible from a front surface side. As described above, since the small ink droplets have better coloring than the large ink droplets, coloring can be suppressed by lowering the usage rate of the small ink droplets.

In the present embodiment, coloring in the nozzle region NA2 is suppressed by lowering the usage rate of small ink droplets in the nozzle region NA2 in which coloring is good, that is, in the nozzle region NA2 where the nozzle array distance D2 is long. As a result, on the medium 50, the difference in coloring between the region M1 printed by the nozzle region NA1 and the region M2 printed by the nozzle region NA2 can be reduced, and the formation of a streak and color unevenness on the medium 50 can be suppressed.

In the technique disclosed in JP-A-2020-40215, the occurrence of a difference in coloring is suppressed by reducing a ratio of overlapping ink droplets on the medium. However, there has been a problem that it is not possible to cope with a case where a printing duty increases in a configuration in which color unevenness is suppressed by preventing the ink droplets from interfering with each other.

On the other hand, in the present embodiment, a usage rate of small ink droplets is reduced in the nozzle region NA2 with good coloring, and coloring in the nozzle region NA2 is suppressed, thereby suppressing the formation of a streak and color unevenness on the medium 50. Therefore, even when the printing duty is increased, it is possible to effectively suppress the formation of a streak and color unevenness on the medium 50.

The above-described first print, that is, a print in which a ratio of ink droplets having a size other than the maximum size in the second ratio is smaller than a ratio of ink droplets having a size other than the maximum size in the first ratio, may be executed when printing on the medium 50 on which the ink droplets 60 are likely to bleed. The medium 50 on which the ink droplets 60 are likely to bleed is, for example, a plain paper. The medium 50 may be a photographic paper, a glossy paper, a mat paper, or the like, and the first print described above may be executed when there is a possibility of occurrence of bleeding in the medium 50 due to the use conditions.

In the present embodiment, there is a combination in which the nozzle arrays 23 have the same nozzle array distance on the same line along the relative movement direction (Y-axis direction). Specifically, as shown in FIG. 2, on the same line along the relative movement direction, a nozzle array distance between the nozzle array 23M (third nozzle array) for magenta and the nozzle array 23C (second nozzle array) for cyan is constant at a distance D3. When the nozzle array 23M for magenta and the nozzle array 23C for cyan are used, blue (B) as a secondary color can be printed. In this case, an upper limit of an ejection ratio of ink droplets having a size other than the maximum size may be set higher in a region where a print is performed by the nozzle array 23M and the nozzle array 23C than in a region where a print is performed by the nozzle region NA2.

Specifically, as shown in the first print of FIG. 6, when the nozzle array distance is the distance D3, small dots=50% and large dots=100% may be set. In this case, since small dots=50% at the nozzle array distance D3 and small dots=20% at the nozzle array distance D2, a setting value of an upper limit of an ejection ratio of ink droplets having a size other than the maximum size is set to be high at the nozzle array distance D3.

The printing device 1 according to the present embodiment may be configured to execute a print (second print) in which there is no difference between a first ratio, which is a ratio of sizes of a plurality of ink droplets ejected from the nozzles 22 in the nozzle region NA1, and a second ratio, which is a ratio of sizes of a plurality of ink droplets ejected from the nozzles 22 in the nozzle region NA2. When the second print is executed, for example, as shown in the second print of FIG. 6, small dots may be set that small dots=50% and large dots=100% in all of the nozzle array distances D1 to D3. The setting values of small dots and large dots in the first print and the second print shown in FIG. 6 are examples, and other setting values may be used in the present embodiment.

FIG. 7 is a table showing a relationship among an input image color, a combination of ink colors, and the nozzle array distance. In FIG. 7, a relationship between the combination of ink colors and the nozzle array distances when the secondary colors of red (R), green (G), and blue (B) are printed using the print head 10 having the configuration shown in FIG. 2 is summarized.

When the input image color is red (R), the combination of ink colors is yellow (Y) and magenta (M), and there is a combination of different nozzle array distances D1 and D2. When the input image color is green (G), the combination of ink colors is yellow (Y) and cyan (C), and there is a combination of different nozzle array distances D1 and D2. When the input image color is blue (B), the combination of the ink colors is magenta (M) and cyan (C). In this case, the nozzle array distance D3 is constant. When an arrangement of the nozzle arrays 23 of each color of the print head 10 shown in FIG. 2 is different, the nozzle array distances is different according to an arrangement of the nozzle arrays 23 of each color.

The printing device 1 according to the present embodiment may include an interface through which a user can designate which of the first print and the second print is to be executed. In this case, the printing device 1 can execute the first print or the second print by the user setting either the first print or the second print using the interface. The interface is, for example, a setting screen displayed on a screen of a PC or a setting screen displayed on a display section (not shown) included in the printing device 1.

The control section 30 may determine which of the first print and the second print is to be executed according to a type of the medium 50 to be used for printing. For example, when a user specifies the medium 50 on which ink is likely to bleed using the interface, the control section 30 may control the print head 10 to execute the first print. Since the difference in coloring between the region M1 and the region M2 is remarkable in the medium 50 into which ink easily penetrates, the control section 30 may execute the first print when such a medium 50 is used.

The control section 30 may determine which of the first print and the second print is to be executed in accordance with the designated print mode. For example, in a case where a user sets a high image quality print mode, the control section 30 may control the print head 10 to execute the first print. In a case where a user designates a printing speed priority print mode, the control section 30 may control the print head 10 to execute the second print.

Such switching between the first print and the second print is performed by the print switching section 35 included in the control section 30 shown in FIG. 1. For example, the print switching section 35 supplies a print signal for switching between the first print and the second print to the ejection control section 34. The ejection control section 34 generates a control signal for controlling the nozzles 22 based on the print signal supplied from the print switching section 35 and print data supplied from the halftone processing section 33.

As shown in FIG. 1, in the present embodiment, the control section 30 may include the environmental information acquisition section 37. In this case, the control section 30 may execute the first print or the second print in accordance with the environmental information acquired by the environmental information acquisition section 37. The environmental information includes temperature, humidity, and the like in a vicinity of the print head 10 of the printing device 1. For example, the environmental information acquisition section 37 may be configured to acquire at least one of temperature and humidity as the environmental information. In this case, the control section 30 may execute the first print or the second print according with the at least one of temperature and humidity acquired by the environmental information acquisition section 37.

For example, the higher humidity of ink is and the lower temperature of ink is, the more difficult it is for ink to dry and the more likely it is for ink to bleed. Therefore, the control section 30 may execute the first print when the humidity acquired by the environmental information acquisition section 37 is higher than a predetermined humidity. The control section 30 may execute the first print when the temperature acquired by the environmental information acquisition section 37 is lower than a predetermined temperature. The control section 30 may execute the first print when the humidity acquired by the environmental information acquisition section 37 is higher than a predetermined humidity and the temperature acquired by the environmental information acquisition section 37 is lower than a predetermined temperature.

Figure 8:
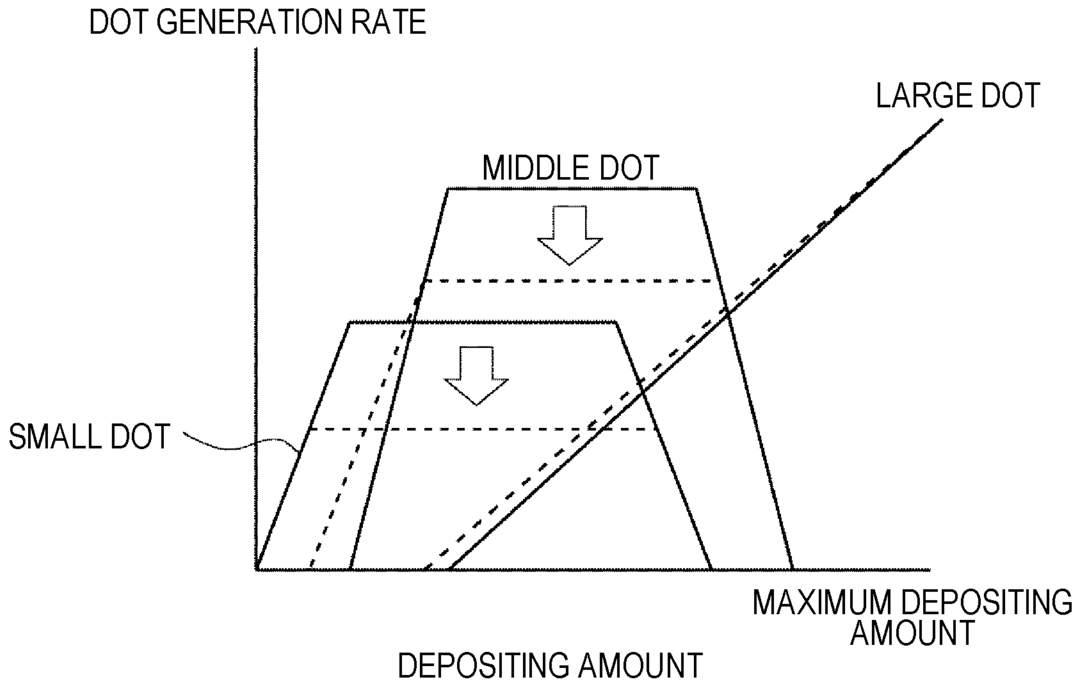
FIG. 8 is a graph showing a depositing amount and a dot generation rate of each size.

FIG. 8 is a graph showing a depositing amount and a dot generation rate of each size. FIG. 8 shows a case where types of ink droplets 60 ejected from the nozzles 22 are three types of a large ink droplet, a meddle ink droplet, and a small ink droplet. In the graph of FIG. 8, a horizontal axis represents an ink depositing amount per unit area to a printing medium, and a vertical axis represents a dot generation rate. Here, the dot generation rate corresponds to a usage rate of ink droplets.

The control section 30 changes a type of ink droplet 60 to be used in accordance with a depositing amount. That is, when the depositing amount is small, small ink droplets are preferentially used, a use of meddle ink droplets is increased as the depositing amount is increased, and a use of large ink droplets is increased as the depositing amount is further increased. The "maximum depositing amount" in FIG. 8 is a depositing amount of ink that can be ejected per predetermined unit area, and is basically a value determined by a type of a printing medium.

As described above, in the present embodiment, the control section 30 executes the print (first print) such that the ratio of ink droplets having a size other than the maximum size in the second ratio is smaller than the ratio of ink droplets having a size other than the maximum size in the first ratio. In the example shown in FIG. 8, the ink droplets having sizes other than the maximum size are the small ink droplets and the meddle ink droplets, and in the first print, a proportion of the small ink droplets and the meddle ink droplets in the second ratio is set to be smaller than a proportion of the small ink droplets and the meddle ink droplets in the first ratio. That is, as indicated by outline arrows in FIG. 8, the proportion of the small ink droplets and the meddle ink droplets in the second ratio (indicated by a broken line in FIG. 8) is smaller than the proportion of the small ink droplets and the meddle ink droplets in the first ratio (indicated by a solid line in FIG. 8). By executing such a first print, it is possible to suppress a formation of a streak and color unevenness on the medium 50. Although FIG. 8 shows a case where a ratio of the small ink droplets and the meddle ink droplets in the second ratio is decreased, only a ratio of the small ink droplets in the second ratio may be decreased in the present embodiment.

In the present embodiment, a test pattern printing step of printing a test pattern capable of acquiring unevenness information relating to print unevenness between the nozzle region NA1 and the nozzle region NA2 may be executed in advance. Either the first print or the second print may be executed according to the unevenness information obtained in the test pattern printing step.

Figure 9:
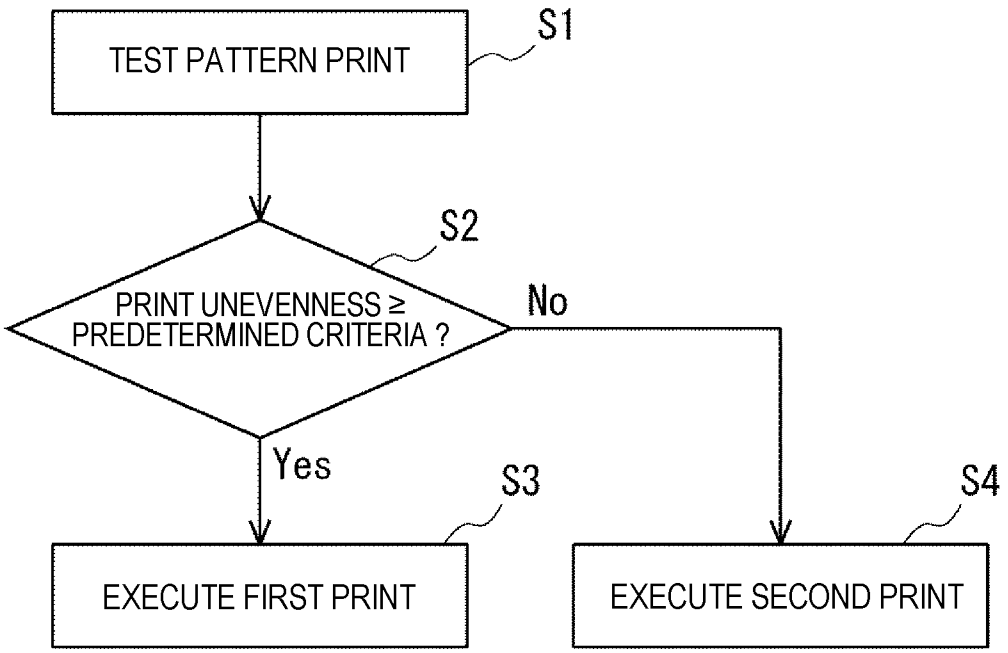
FIG. 9 is a flowchart showing an example of an operation of the printing device according to the embodiment.

FIG. 9 is a flowchart showing an operation of the printing device 1 according to the present embodiment, and is a flowchart for explaining an operation including the test pattern printing step. First, the printing device 1 prints a test pattern on the medium 50 set by a user (step S1). As the test pattern, a combination pattern is used in which the nozzle arrays 23 have different nozzle array distances D1 and D2 on the same line along the relative movement direction. For example, since a combination of yellow (Y) and cyan (C) is a combination having different nozzle array distances D1 and D2, a solid pattern of green (G), which is a secondary color of yellow (Y) and cyan (C), is printed on the medium 50. At this time, the printing device 1 executes the test pattern print by the second print in which there is no difference between the first ratio of the nozzle region NA1 and the second ratio of the nozzle region NA2.

Thereafter, the unevenness information is acquired from the test pattern printed in step S1, and when the print unevenness is equal to or greater than a predetermined criteria (step S2:Yes), the first print is executed (step S3). On the other hand, when the print unevenness is smaller than the predetermined criteria (step S2:No), the second print is executed (step S4).

For example, in a case where the printing device 1 includes a scanner, the unevenness information may be acquired by reading the test pattern with the scanner. The printing device 1 executes the first print when the print unevenness is equal to or greater than a predetermined criteria, that is, when unevenness between the region M1 of the medium 50 printed by the nozzle region NA1 and the region M2 of the medium 50 printed by the nozzle region NA2 is equal to or greater than a predetermined criteria. The unevenness of the region M1 and the region M2 of the medium 50 may be automatically determined using image information read by a scanner. In a case where a user visually recognizes the test pattern and determines that the print unevenness is equal to or greater than the predetermined criteria, the user may set a print setting to the first print using the interface.

The present disclosure is not limited to the above-described embodiments, and various modifications can be made without departing from the scope of the disclosure. In the print head 10 shown in FIG. 2, the plurality of head chips 21*a* to 21*f* are provided so as to be oblique to the X-axis direction. However, the present disclosure can also be applied to a print head configured such that a longitudinal direction of the plurality of head chips 21 extends in the X-axis direction and the plurality of head chips 21 are arranged in the Y-axis direction.

In the print head 10 shown in FIG. 2, the nozzle arrays 23 of the same color do not overlap each other in the Y-axis direction. However, in the present disclosure, the nozzle arrays 23 of the same color may be arranged so as to overlap each other in the Y-axis direction. That is, the nozzle arrays 23C for cyan may be configured to overlap on the same line in the Y-axis direction between the head chips. The nozzle arrays 23M for magenta may be configured to overlap on the same line in the Y-axis direction between the head chips. The nozzle arrays 23Y for yellow may be configured to overlap on the same line in the Y-axis direction between the head chips. The nozzle arrays 23K for black may be configured to overlap on the same line in the Y-axis direction between the head chips.

While the present disclosure has been described with reference to the above embodiment, it is to be understood that the present disclosure is not limited to the configuration of the above embodiment, but includes various changes, modifications, and combinations that can be made by a person skilled in the art within the scope of the disclosure claimed in the claims of the present application.

What is claimed is:

1. A printing device comprising:

a print head that includes a plurality of nozzles configured to eject ink droplets onto a medium, and that includes a plurality of nozzle arrays in which the nozzles are arranged in a nozzle array direction and a control section configured to control ejection of the ink droplets from the nozzles, wherein the print head and the medium relatively move in a relative movement direction different from the nozzle array direction, the print head includes first nozzle arrays and second nozzle arrays that eject different ink droplets, a number of the first nozzle arrays and a number of the second nozzle arrays are each two or more, the plurality of nozzle arrays which eject ink droplets on a same line along the relative movement direction include a first nozzle region in which a distance between the first nozzle array and the second nozzle array in the relative movement direction is a first distance and a second nozzle region in which a distance between the first nozzle array and the second nozzle array in the relative movement direction is a second distance which is longer than the first distance, the nozzles are configured to form dots of a plurality of sizes on the medium by ejecting ink droplets of a plurality of sizes, and when a ratio of sizes of a plurality of ink droplets ejected from the nozzles of the first nozzle region is defined as a first ratio and a ratio of sizes of a plurality of ink droplets ejected from the nozzles of the second nozzle region is defined as a second ratio, the control section executes a first print in which a ratio of ink droplets having a size other than a maximum size in the second ratio is smaller than a ratio of ink droplets having a size other than a maximum size in the first ratio.

2. The printing device according to claim 1, wherein the second ratio has a smaller usage rate of the smallest ink droplet among the ink droplets of the plurality of sizes than the first ratio.

3. The printing device according to claim 1, wherein the control section executes the first print when printing on a medium on which the ink droplets are likely to bleed.

4. The printing device according to claim 1, further comprising: a plurality of different print modes, wherein the control section is configured to execute a second print in which there is no difference between the first ratio of the first nozzle region and the second ratio of the second nozzle region and to execute the first print or the second print in accordance with the print modes.

5. The printing device according to claim 4, wherein the control section executes the first print when the print mode is a high image quality print mode.

6. The printing device according to claim 1, further comprising:

an environmental information acquisition section configured to acquire environmental information around the printing device, wherein the control section is configured to execute a second print in which there is no difference between the first ratio of the first nozzle region and the second ratio of the second nozzle region and to execute the first print or the second print in accordance with the environmental information.

7. The printing device according to claim 6, wherein the environmental information acquisition section is configured to acquire at least one of temperature and humidity as the environmental information and the control section executes the first print or the second print in accordance with the at least one of temperature and humidity acquired by the environmental information acquisition section.

8. The printing device according to claim 1, wherein the control section is configured to execute a second print in which there is no difference between the first ratio of the first nozzle region and the second ratio of the second nozzle region, the print head includes third nozzle arrays that eject ink droplets different from the first nozzle arrays and the second nozzle arrays, a distance between the second nozzle array and the third nozzle array in the relative movement direction is constant, and a region where a print is performed by the second nozzle arrays and the third nozzle arrays has a higher upper limit of an ejection ratio of ink droplets having a size other than the maximum size compared to a region where a print is performed by the second nozzle region.

* * * * *